(Model.)

S. B. LARD.
WATER WHEEL.

No. 391,539. Patented Oct. 23, 1888.

WITNESSES:
Fred. G. Dieterich
Chas. R. Wright

INVENTOR:
S. B. Lard
BY Munn & Co
ATTORNEYS.

UNITED STATES PATENT OFFICE.

SELDEN B. LARD, OF WATERVILLE, KANSAS.

WATER-WHEEL.

SPECIFICATION forming part of Letters Patent No. 391,539, dated October 23, 1888.

Application filed September 29, 1887. Serial No. 251,081. (Model.)

*To all whom it may concern:*

Be it known that I, SELDEN B. LARD, of Waterville, in the county of Marshall and State of Kansas, have invented a new and useful Improvement in Water-Wheels, of which the following is a specification.

The invention consists of a water-wheel provided with a series of overlapping leaves or buckets pivoted a little at one side of their center, and with a series of loosely-pivoted and sliding catches for engaging the leaves or buckets when folded, to lock them closed.

The invention also consists in the peculiar construction and arrangement of parts, all as hereinafter fully described, and pointed out in the claims.

Figure 1:
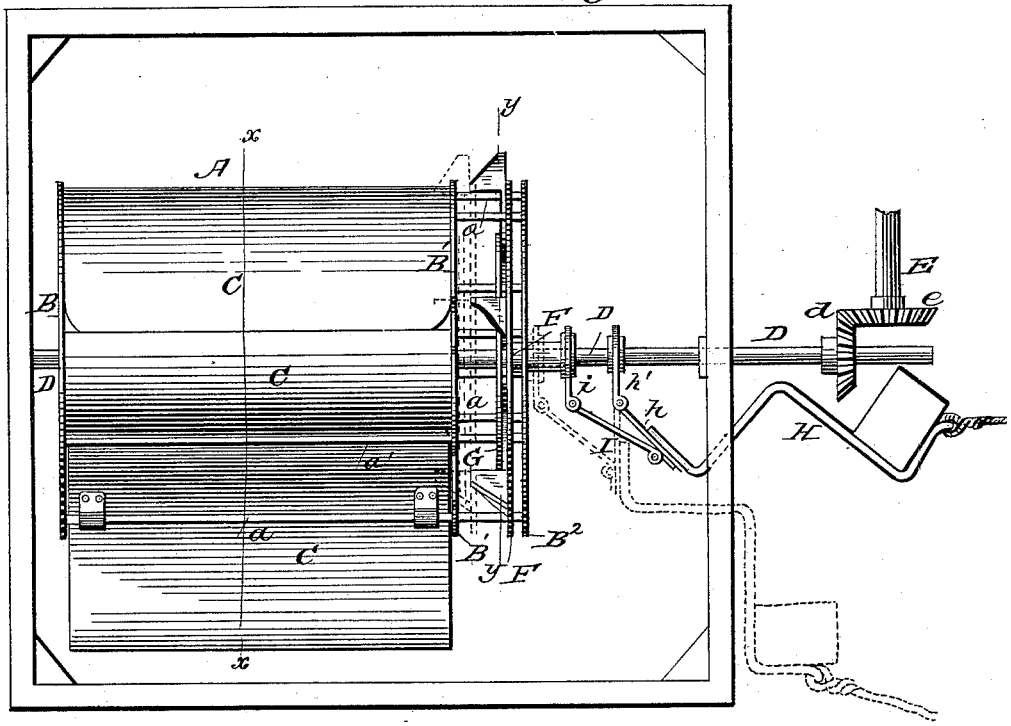
Figure 2:
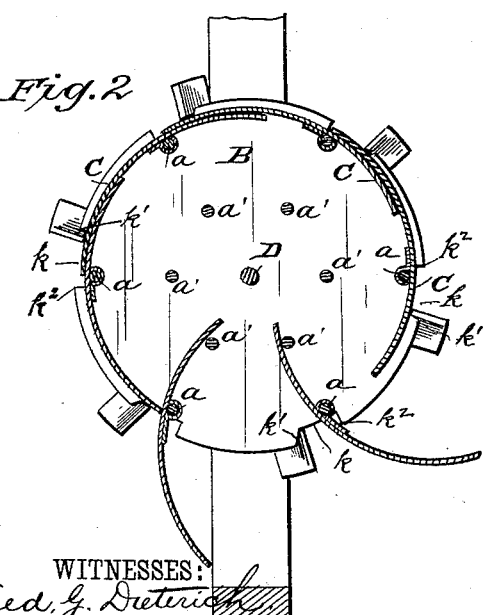
Figure 3:
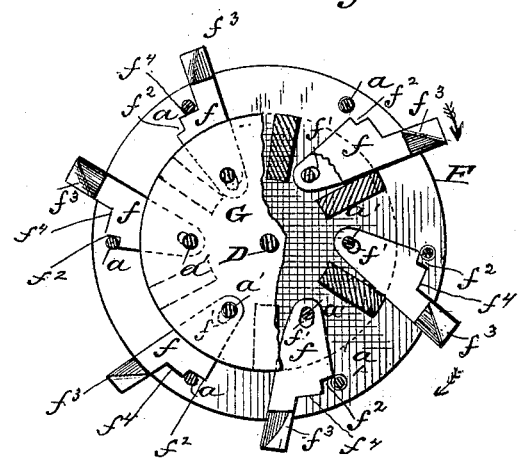

Figure 1 is a side elevation of my improvement. Fig. 2 is a section on line $x\ x$ of Fig. 1, and Fig. 3 is a section on line $y\ y$ of Fig. 1. Similar letters of reference indicate corresponding parts in all the figures.

Referring to the drawings by letter, A represents the wheel, which is composed of the heads B B' and the series of hinged leaves or buckets C. The head B' is notched, as shown, for a purpose hereinafter described. The leaves or buckets C, of which there can be any number, are curved, and are hinged at one side of their center upon the rods $a$, extending from one head to the other and projecting from the head B' and secured to a disk or plate, B², as shown, for a purpose hereinafter described. The leaves or buckets when closed overlap each other, and are held open against the action of the water by means of a second series of rods, $a'$, which also project from the head B', and are secured to the plate or disk B². The front edges of the overlapping parts of the leaves project beyond the rear shoulders, $e'$, of the notches $k$ in head B', and to within a short distance of the front shoulders, $k^2$, of the said notches, as clearly shown in Fig. 2. The wheel A is secured upon the shaft D, provided with a beveled pinion, $d$, which meshes with the pinion $e$ on the shaft E, from which shaft E power is to be transmitted to the machinery to be driven.

Fitted to slide on the shaft D is the head F, carrying the catches $f$, for locking the leaves or buckets closed. The head F is of the same size as the heads B B', and is provided with a series of apertures for the passage of the projecting ends of the rods $a\ a'$, by means of which it is caused to revolve with the wheel and is guided in its movements on the shaft.

To the inside of the head F is secured a plate, G, the space between which and the said head being divided into as many compartments as there are catches $f$. In the compartments between the head F and the plate G, and on the rods $a'$, the catches $f$ are pivoted. The catches are provided with elongated openings $f'$, through which the said rods pass, by means of which the said catches are loosely pivoted, for a purpose presently described. The said catches are provided with the notches or offsets $f^2$ and $f^4$ and the hook $f^3$ at the outer end of the said catches, the said hook projecting inwardly and adapted to engage the leaves to hold them closed. By loosely pivoting the catches, as described, and providing them with the offsets $f^2\ f^4$, provision is made for permitting the leaves or buckets to be successively closed after the head F has been moved inward toward the head of the wheel. The elongated openings allow the catches to drop down when on the under side of the wheel, to permit the leaves or buckets to fold, after which the catches drop back on the rods $a'$ and in the direction of the arrows, Fig. 3, to hold the leaves or buckets closed, the offsets $f^4$ serving to allow sufficient play of the catches during the above-described movement, and the offsets $f^2$, by engaging the rods $a$, preventing the catches from moving while on the under side and until they arrive at the upper part of the wheel, when they drop back upon the rods $a'$, as shown in the upper part of Fig. 3 of the drawings.

The head F is provided with an elongated hub, which projects through the plate or disk B², and to its end and to the shaft D is attached the mechanism for operating the said head. This mechanism consists of the lever H, having a weight on its outer end and carrying at its inner end an arm or plate, $h$, which is hinged to a plate, $h'$, secured between collars on the shaft D. To the lower end of the arm or plate $h$ is hinged the plate or arm I, the other end of which arm is hinged to a plate, $i$, secured between collars on the end of the elongated hub of the head F. A chain or rope is attached to the outer end of the lever, and is to be secured to some object, so as to hold the head F away from the head B' when the wheel is running.

From the above-described construction it will be seen that when the wheel is wholly or partially submerged and the head F is moved outward to disengage the catches $f$ from the leaves or buckets the leaves or buckets will as the wheel revolves fall open one after another, and, their inner ends engaging the rods $a'$, they will be held open to receive the force of the water and the wheel thereby revolved. As the wheel continues to revolve, and after the water has spent its force on the said leaves, they automatically close until they reach the other side, when they will again open. To stop the wheel, it is only necessary to slacken the cord or chain attached to the lever H, when the head F will be moved inward toward the head of the wheel, and the catches $f$, passing through the notches in the head B', will engage the leaves or buckets and lock them closed. The pinion $d$ will be made movable on its shaft D, so that it can be slipped in and out of gear with the pinion $e$ on the shaft E. A similar shifting mechanism to that above described for the head F may be employed for the pinion $d$.

Instead of the plate G, with its compartments, staples forming guides for the catches might be employed.

Having thus described my invention, what I claim, and desire to secure by Letters Patent, is—

1. In a water-wheel, the combination of a series of overlapping leaves or buckets pivoted a little at one side of their centers between two heads, and a series of loosely-pivoted and sliding catches for engaging the leaves or buckets when folded, to lock them closed, substantially as described.

2. In a water-wheel, the combination, with two heads and rods connecting the same, of a series of overlapping leaves pivoted at one side of their centers on the said rods, a sliding head, and catches pivoted to the said head and adapted to engage the leaves when the head carrying the same is moved up to the head of the wheel, substantially as herein shown and described.

3. In a water-wheel, the combination, with the heads B B', the shaft D, to which the heads are secured, and the leaves or buckets C, pivoted between the heads, of the sliding head F, the pivoted catches $f$, the weighted lever H, and connection between the said lever and the head and shaft, substantially as herein shown and described.

4. In a water-wheel, the combination, with the pivoted plates or buckets C and the sliding head F, of the catches $f$, loosely pivoted to the head and provided with the notches $f^2$, and the hook $f^3$, substantially as herein shown and described.

5. In a water-wheel, the combination, with the heads B B', the disk $B^2$, the rods $a\ a'$, and the shaft D, of the plates or buckets C, pivoted on the rods $a$, the sliding head F, moving on said rods, and the catches $f$, pivoted on the rods $a'$, substantially as herein shown and described.

SELDEN B. LARD.

Witnesses:
F. P. THORNE,
J. E. BAILIFF.